Patented July 23, 1929.

1,722,137

UNITED STATES PATENT OFFICE.

MOXIE L. FRISCHER, OF KANSAS CITY, MISSOURI, ASSIGNOR TO WESTERN BOILER COMPOUND AND CHEMICAL COMPANY, OF KANSAS CITY, MISSOURI, A CORPORATION OF MISSOURI.

METHOD OF TREATING WATER AND MATERIALS USED IN CONNECTION THEREWITH.

No Drawing.   Application filed January 21, 1927. Serial No. 162,690.

This invention relates to solutions for softening and clarifying water and it comprises a solution containing soluble water-softening agents, such as carbonates, sulphides, phosphates or fluorides in conjunction with aluminum hydroxide disolved by the addition of an alkali metal hydroxide, the whole forming a solution having the dual property of both softening and clarifying water.

My invention relates more specifically to a method of dissolving aluminum hydroxide by means of caustic soda, caustic potash, sodium fluoride, trisodium phosphate, sodium carbonate, sodium sulphide, barium hydrate and similar substances furnishing hydroxyl ions.

Various substances have been used as a water coagulant including aluminum sulphate and various by-products of the manufacture of other aluminum products. They have the disadvantage that inactive substances are added to the water, and that the treatment is not perfectly controlled because of the unsatisfactory nature of the products commercially available. Most of the solutions which contain the aluminum compounds in alkaline form yield precipitates on standing, thus changing the effectiveness of the solution and giving a very unsatisfactory product. In all cases it is desired to separate a flocculent precipitate of aluminum hydroxide when the mixture or solution is added to the water to be treated. In part, the object of my invention is to provide a pure aluminum hydroxide which may be delivered in the form of a perfect solution and may be then precipitated in the form of a highly flocculent and pure aluminum hydroxide.

In a typical case, I use a mixture in the proportions of ten pounds of aluminum hydroxide with eight pounds of caustic potash. The caustic potash is advantageously added in the form of a concentrated solution having a specific gravity of about 1.30. If caustic soda is used instead of caustic potash, six pounds are used in strong solution for each ten pounds of aluminum hydroxide. When sodium fluoride is added as the softening agent, it is preferable to mix one pound with five pounds of caustic soda, or with seven pounds of caustic potash for each ten pounds of aluminum hydroxide. The sodium fluoride may be substituted by three pounds of trisodium phosphate the latter also being a water softening agent.

The purpose of these various substances is to maintain the aluminum hydroxide in solution and at the same time provide substances which in themselves have the ability to precipitate magnesium, calcium and iron compounds from water. The purpose of such treatment is to remove the hardness which consumes soap or causes incrustation in boilers or other equipment in which the water is heated. When these and similar compounds react on water carrying, for example, calcium bicarbonate, a finely precipitated calcium carbonate is formed which does not readily settle, but in the presence of the aluminum hydroxide which is precipitated simultaneously with the separation of the calcium carbonate, the water is completely clarified by reason of the flocculent or feathery condition of the aluminum hydroxide. All of the precipitated substances settle out on the bottom of the tank or may be readily filtered off by the usual means. The hardness in the water may exist in the form of temporary hardness, as illustrated by calcium bicarbonate, or may exist in the form of permanent hardness, as illustrated by calcium sulphate. The temporary hardness is so called because of the fact that it may be eliminated by boiling off the carbon dioxide which is chemically combined with the lime and magnesium salts. The permanent hardness, however, is not removed by boiling nor is it removed by the use of caustic soda or caustic potash. This is why it is necessary to use other substances along with the caustic potash or caustic soda which will directly combine with the permanent hardness. Such substances include sodium fluoride which forms an insoluble calcium fluoride, sodium phosphate which forms insoluble calcium or magnesium phosphates, and sodium carbonate which forms insoluble calcium or magnesium carbonates. It is an important part of my invention to use a combination of the hydroxide with the direct precipitant of the permanent hardness.

In addition to the above enumerated substances, in many instances, particularly in water carrying a considerable amount of sulphates, barium hydrate is useful. In this case a typical mixture would consist of ten pounds of aluminum hydroxide, twenty pounds of barium hydroxide and ten pounds of caustic soda. In general, this solution should be made from a saturated solution of barium hydroxide while hot, as the barium hydroxide is very much more soluble in hot water than in cold water. The following list gives, in a general way, the minimum amount of the various substances to use along with the aluminum hydrate to get the proper solution effect:

For each ten pounds of aluminum hydrates:

|   | Pounds. |
|---|---|
| Caustic soda | 5 |
| Caustic potash | 7 |
| Sodium fluoride | 5½ |
| Sodium phosphate | 16 |
| Barium hydrate | 20 |

These various substances may be substituted for each other to a considerable degree, the substitutions being in accordance with the above proportions.

The action of the compounds in dissolving aluminum hydroxide is a very complex one, the probability being in the case of caustic potash that the aluminum hydroxide reacts with the hydroxl ions in accordance with the following equation:

$$Al(OH)_3 + OH^- = Al(OH)^-_4$$

In accordance with the mass law for chemical reactions, anything which will increase the concentration of hydroxyl ions will increase the solubility of the aluminum hydroxide and may be shown from the following equation, where $C_1$ is equal to the concentration of the aluminum hydroxide.

$C_2$ is equal to the concentration of the hydroxyl ion.

$C_3$ is equal to the concentration of the $Al(OH)^-_4$ ion.

According to the well known principle of the mass law, $$\frac{C_1 C_2}{C_3} = K \text{ (a constant)}.$$

Therefore, any increase in the concentration of hydroxyl ions or $C_2$ would result in a decrease in the concentration of the aluminum hydroxide $C_1$ and a consequent increase in the concentration of the $Al(OH)^-_4$ ion or $C_3$ to obey the mass law. Therefore, in general it may be said that anything which will increase the concentration of the hydroxyl ions will increase the solubility of aluminum hydroxide. It must be borne in mind that $C_1$ refers to the concentration of dissolved aluminum hydroxide, not to the precipitate or suspended aluminum hydroxide.

In my water treating solution, it will be noticed that I provide an excellent coagulant in conjunction with the usual water softening agents, the aluminum hydroxide being kept in solution, and the precipitation of aluminum salts, such as the fluoride, or phosphate, being prevented by the presence of the alkali metal hydroxide. And in the appended claims, by water-softening agents, I mean to include soluble phosphates, sulphides, carbonates or barium hydroxide.

I claim as my invention:

A water clarifying and softening solution, comprising an aqueous solution of sodium fluoride, aluminum hydroxide and a water softening agent, the sodium fluoride being in sufficient quantity to dissolve the aluminum hydroxide and to prevent precipitation of aluminum compounds.

MOXIE L. FRISCHER.